United States Patent [19]

Teshirogi

[11] Patent Number: 4,543,579

[45] Date of Patent: Sep. 24, 1985

[54] CIRCULAR POLARIZATION ANTENNA

[75] Inventor: Tasuku Teshirogi, Koganei, Japan

[73] Assignee: Radio Research Laboratories, Ministry of Posts and Telecommunications, Tokyo, Japan

[21] Appl. No.: 550,120

[22] Filed: Nov. 9, 1983

[30] Foreign Application Priority Data

Mar. 29, 1983 [JP] Japan ............ 58-51498

[51] Int. Cl.[4] ............ H01Q 21/06; H01Q 21/24; H04B 7/10

[52] U.S. Cl. ............ 343/365; 343/700 MS

[58] Field of Search ............ 343/363, 364, 365, 366, 343/700 MS

[56] References Cited

U.S. PATENT DOCUMENTS 4,318,107 3/1982 Pierrot et al. ............ 343/700 MS 4,345,255 8/1982 Komuro et al. ............ 343/366

FOREIGN PATENT DOCUMENTS 56-160103 12/1981 Japan .

58-59606 4/1983 Japan .

*Primary Examiner*—Theodore M. Blum

*Attorney, Agent, or Firm*—Oblon, Fisher, Spivak, McClelland & Maier

[57] ABSTRACT

A circular polarization antenna having wide-band circular polarization characteristics and impedance characteristics is accomplished by feedng N-antenna elements which are shifted at an interval of π/N rad. with respect to the boresight direction with differential phase shift of an interval of π/N rad. corresponding to the angular orientation of the antenna elements so as to obtain perfect circular polarization with respect to the boresight direction. This antenna construction can be applied to circular polarization antennas of various types, thereby allowing a wide-band circular polarization array antenna or an array antenna for dual orthogonal circular polarizations having high polarization discrimination to be achieved.

5 Claims, 13 Drawing Figures

CIRCULAR POLARIZATION ANTENNA

BACKGROUND OF THE INVENTION

This invention relates to a circular polarization antenna and, more particularly, to an orthogonal dual polarization common array antenna of high performance, wide frequency coverage and high discrimination.

In satellite communication with respect to ships, aircrafts, marine buoys, etc. the position and orientation of moving objects change with time with respect to electromagnetic waves arriving from a satellite, so that circular polarization antennas which do not require polarization tracking are used. Also, it is prescribed to use circular polarized waves for direct broadcasting via satellite in the 12-GHz band. Systems adopting the circular polarization require circular polarization antennas, which have excellent polarization characteristics and impedance characteristics over wide band. Further, frequency re-use systems where orthogonal polarization at an identical frequency are used particularly require antennas of high polarization discrimination.

Turnstile antennas have heretofore been most extensively used as circular polarization antennas. In this kind of antennas, two half-wave dipoles are disposed orthogonally and furnished with power in a 90-degree phase shift relationship. In the antenna of this type, if a frequency deviation from the center frequency occurs due to the structure of feed lines and frequency characteristics of a hybrid circuit, the 90-degree phase difference can no longer be maintained to result in elliptical polarization even in the boresight direction. Further, even if the phase difference of 90 degrees is maintained, the circular polarization is deteriorated in the off-axis region due to the difference between the E- and H-plane radiation patterns of the dipole antenna.

An antenna to be fed with equal amplitude and 90-degree phase shift at two points of a rectangular or circular microstrip patch antenna, is based on the same principles as the turnstile antenna noted above. This antenna is thin in shape and light in weight. On the demerit side, however, the frequency coverage of this antenna is generally narrower than that of a dipole antenna. There have been attempts to increase the frequency coverage by using thick substrate of low dielectric constants, e.g., honeycomb substrate. In this case, such problems as disturbance of the radiation pattern due to generation of higher modes and high price of the substrate arise.

It has been proposed an array antenna structure to be described hereinafter in order to solve the various problems in cases where the prior art circular polarization antenna described above is used in a vehicle.

More specifically, in a case where an element antenna does not have sufficiently broad circular polarization characteristics or impedance characteristics, it is thought to construct an array antenna in such a manner as to increase the frequency coverage. As a prior art system based on the technology noted above there is one, in which a pair of elements constitutes a unit structure of an array (Haneishi, Yoshida, Goto, "Patch Antennas and Their Pairs", Papers of Technical Group on Antennas and Propagation, A.P 81-102, November 1981. In this system, two elliptically polarized antennas are disposed in a 90-degree orientation angle difference relationship and excited in 90-degree phase shift relationship. Perfect circular polarization can be obtained in the boresight direction irrespective of the polarization factor of the individual elements of the two-element array. This system can be regarded as a modification of the turnstile antenna noted above. However, a two-element pair array antenna can be constructed only when the elements in the array are even in number, and the system noted cannot be applied to, for instance, circular aperture antennas with triangular arrangement of element. Further, there are limitations on the frequency coverage of the method described.

SUMMARY OF THE INVENTION

An object of the invention is to provide a circular polarization antenna, which has wide-band circular polarization characteristics and impedance characteristics and is effective as a wide-band circular polarization antenna or orthogonal circular polarization common antenna with high polarization discrimination.

To attain the above object of the invention, there is provided a circular polarization antenna comprising a plurality of antenna elements with the orientation thereof with respect to the boresight axis shifted one from another by a predetermined angle and each thereof having at least one feed point and a feed section for power-feeding or power-receiving of the individual antenna elements with the phase shift corresponding to the angular orientation relationship of the antenna elements to one another.

Where N ($N \geqq 3$) antenna elements individually have one or more feed points with the orientation thereof with respect to the boresight axis shifted one from another by $\pi/N$ radians with respect to the feed point or points of a reference antenna element, perfectly circular polarization in the boresight direction can be obtained by feeding power to the individual antenna elements in a $\pi/N$-radian phase shift relationship to one another corresponding to the angular orientation relationship. Thus, even if the polarization characteristics of the antenna element cover a narrow frequency band and the circular polarization factor is deteriorated at the frequency deviated from the center frequency, the wide-band characteristics can still be ensured. It is thus possible to obtain a circular polarization antenna having wide-band circular polarization characteristics and impedance characteristics, and is also possible to realize a wide-band circular polarization array antenna and further a high polarization discrimination array antenna for use of two orthogonal circular polarizations. Further, because of the reciprocality of antenna the system is not only effective as a transmitting antenna but the same effects can be obtained when it is used as a receiving antenna.

The above and further objects, features and advantages of this invention will become more apparent from the detailed description of the preferred embodiments when the same is read with reference to the accompanying drawings.

BRIEF EXPLANATION OF THE DRAWINGS

FIG. 1(*b*) is a view showing the elliptical polarization of electromagnetic waves radiated from an n-th antenna element in the boresight direction and an angle thereof with respect to the reference antenna element;

FIG. 3(*b*) is a schematic representation of the feed section in the first embodiment of the array antenna;

FIG. 6(*b*) is a schematic representation of the circuit of a power supply section in the second embodiment;

DESCRIPTION OF THE PREFERRED EMBODIMENTS

This invention relates to circular polarization antennas, which can transmit and receive excellent circular polarized waves over wide frequency band and have high polarization discrimination.

Prior to describing the preferred embodiments of this invention, the principles underlying the invention will first be described.

This invention is based on the principle that perfectly circular polarized waves can be obtained by disposing a plurality of antenna elements at a constant orientation angle with respect to one another and feeding power to these antennas in a phase relationship corresponding to the orientation angle relationship.

Figure 1A:
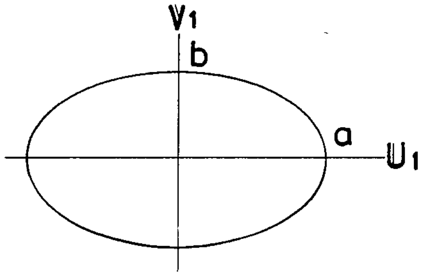
FIG. 1(*a*) is a view showing the elliptical polarization of electromagnetic waves radiated from a reference antenna element in the boresight direction and orthogonal vectors thereof.
Figure 1B:
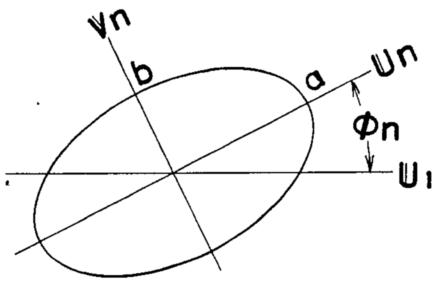

Assume an array antenna consisting of N elements of identical structure placed at arbitrary positions on a plane. Electromagnetic waves radiated from each antenna element are generally elliptically polarized. If the polarization of electromagnetic waves radiated from a first antenna element as a reference antenna in the boresight direction is elliptical as shown in FIG. 1, the polarization vector $E_1$ can be expressed as $$E_1 = a\cdot \mathbf{u}_1 + j\cdot b\cdot \mathbf{v}_1 \tag{1}$$

where $\mathbf{u}_1$ and $\mathbf{v}_1$ represent orthogonal unit vectors, a and b represent respective components in the directions of the $\mathbf{u}_1$ and $\mathbf{v}_1$ vectors, and j is the imaginary number unit indicative of phase advancement by $\pi/2$. Now it is assumed that the n-th element is disposed at the orientation angle $$\phi_n = p(n-1)\pi/N(rad.) \tag{2}$$

(p being a revolution coefficient of an integral number of $1 \leqq p \leqq N-1$) with respect to the reference element and excited by phase shift of $\phi_n$ with respect to the phase for the reference element. The polarization of electromagnetic waves radiated from the n-th element in the boresight direction in this case is elliptical as shown in FIG. 1(*b*) and expressed as $$E_n = (a\cdot \mathbf{u}_n + j\cdot b\cdot \mathbf{v}_n)e^{j\cdot\phi_n} \tag{3}$$

The vectors $\mathbf{u}_n$ and $\mathbf{v}_n$ are at the angle $\phi_n$ with respect to the vectors $\mathbf{u}_1$ and $\mathbf{v}_1$ respectively. By expressing $\mathbf{u}_n$ and $\mathbf{v}_n$ using $\mathbf{u}_1$ and $\mathbf{v}_1$ and calculating the sum E of radiation from all the antenna elements, it is verified that with respect to the boresight direction there holds $$E = \sum_{n=1}^{N} /E_n = \frac{N}{2}(a+b)(\mathbf{u}_1 + j\cdot \mathbf{v}_1) \tag{4}$$

It will be seen that this represents a perfectly circular polarized wave having the same sense of rotation as a single element. It will be seen that a perfectly circular polarization antenna can be realized with what is commonly termed a sequential antenna, consisting of antenna elements having arbitrary polarization characteristics and placed at given positions if the antenna elements are orientated at an angle of $p\cdot\pi/N$ rad. with respect to one another and excited in a $p\cdot\pi/N$ rad. phase shift relationship to one another corresponding to the orientation angle relationship. According to the principles described above, even though the polarization characteristics of the antenna elements may be rather narrow in frequency band so that the circular polarization factor is deteriorated at frequencies apart from the center frequency, it is possible to obtain circular polarization of the array and thus realize a wide-band circular polarization antenna.

Figure 2:
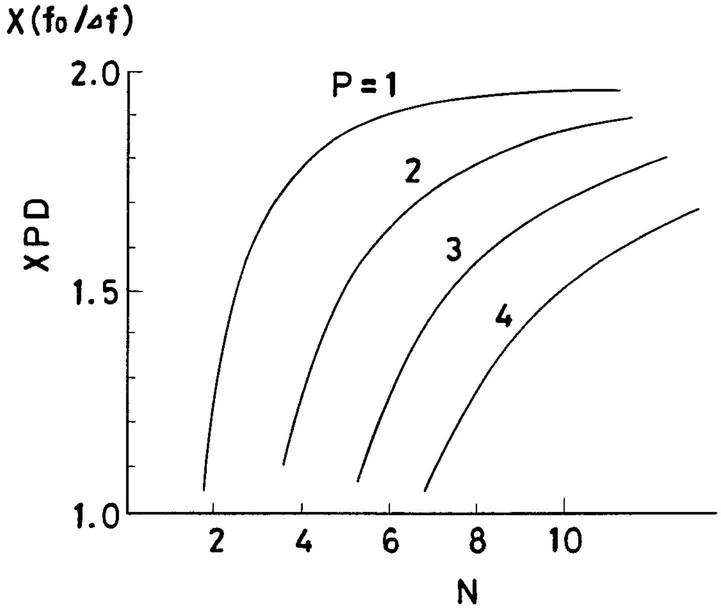
FIG. 2 is a graph showing the degree of improvement of XPD (cross polarization discrimination) of an array antenna according to this invention.

FIG. 2 shows the degree of improvement of the cross polarization discrimination (XPD) obtained by the sequential structure over the unit element. In FIG. 2, $f_0$ represents the center frequency, and $\Delta f$ represents the frequency deviation from $f_0$. It will be seen from the Figure that the frequency characteristics of the polarization factor are the broadest when $p=1$ and increase with increase of the number of elements N. Further, not only the polarization factor, but also the impedance characteristics are improved. More specifically, the reflected waves from the individual elements differ in phase by $2\phi_n$ from one another at the center frequency so that the sum of the total reflected waves returning to the input terminal of the array antenna is 0.

Further, for the same reasons as polarization factor, the sequential structure permits increase of the frequency coverage of the VSWR (voltage standing wave ratio), the frequency coverage being greatest when $p=1$.

While the principles of the sequential circular polarization antennas have been described in connection with an array antenna as an example, the same principles also apply to a single antenna.

The embodiments of the invention will now be described. All the embodiments concern transmitting antennas, but since the antenna has reciprocality, the invention is of course applicable not only to transmitting antennas but also to receiving antennas. Further, in the following description the aforementioned value p is set to 1, which is most effective in practice, but this is by no means limitative.

Figure 3A:
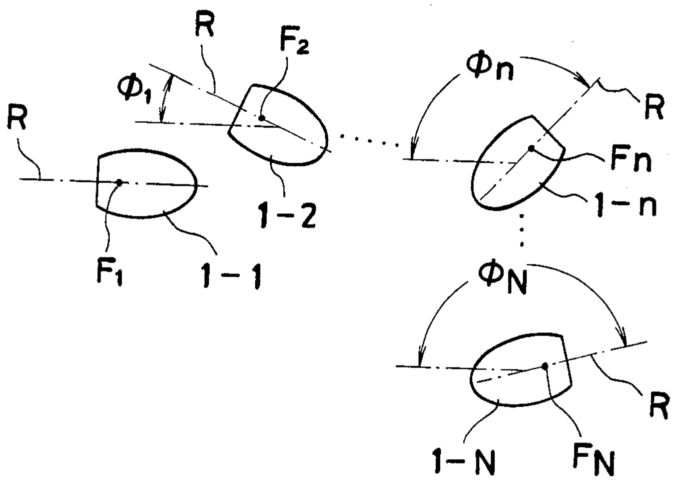
FIG. 3(*a*) is a plan view schematically showing an array antenna as a first embodiment of this invention.
Figure 3B:
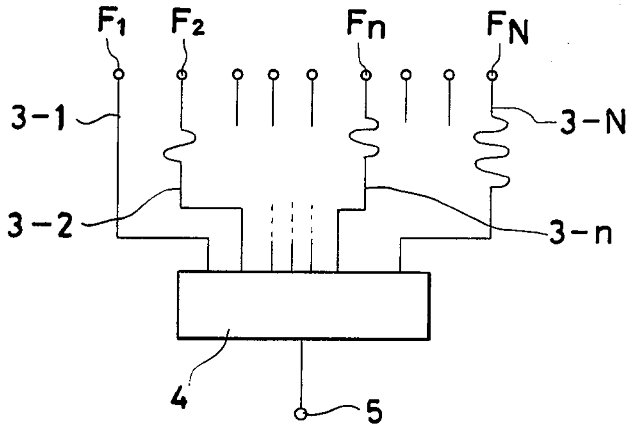

FIGS. 3(*a*) and 3(*b*) show a first embodiment of the invention applied to a circular polarization antenna constructed as an N-element array antenna by disposing N ($N \geqq 3$) antenna elements having the same polarization characteristics at arbitrary positions in a plane. In this embodiment, each of N antenna elements 1-1, 1-2, . . . , 1-N is a patch antenna printed on the surface of a substrate, but it need not be a patch antenna. Each patch antenna element has a shape obtained by removing part of an ellipse. This is a measure for facilitating the recognition of the orientation of the antenna element, and this shape is by no means limitative and the antenna element may have any other desired shape such as a circular, square or elliptical shape. Further, the number of antenna elements is set to N ($N \geqq 3$). If the number is $N=2$, the structure can be regarded as a modification of the turnstile antenna, so this number is excluded according to this invention.

Feed points $F_1$ to $F_N$ of the respective antenna elements 1-1 to 1-N are disposed on a reference line R. The individual antenna elements 1-1 to 1-N are disposed with the orientation angle shifted by $\pi/N$ (the n-th element is angled at $(n-1)\cdot\pi/N$ in relation to the reference element) with respect to one another and are excited by respective phase shift of $\pi/N$ with one another by corresponding feed lines 3-1, 3-2, . . . , 3-n, . . . , 3-N.

A power divider 4 is adapted to distribute power such that a signal of a uniform amplitude is supplied to each element for excitation. With this array, in view of the principles described above, perfectly circularly polarized waves can be emitted in the boresight direction at the center frequency while eliminating reflected waves returning to the input terminals. Further, regarding the polarization factor and VSWR, the frequency coverage is increased with increasing the number of elements N.

Figure 4:
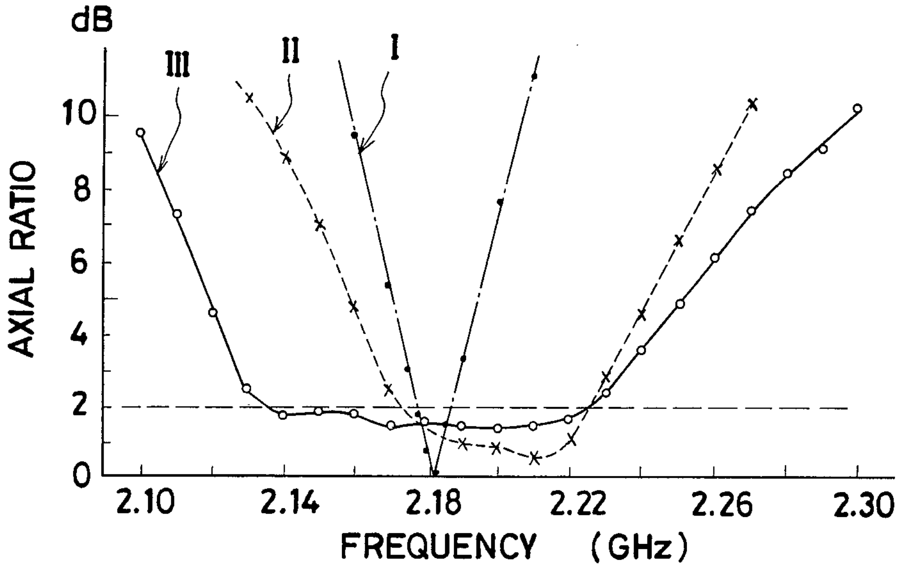
FIG. 4 is a graph showing the axial ratio versus frequency of the array antenna of the first embodiment and corresponding conventional characteristics.
Figure 5:
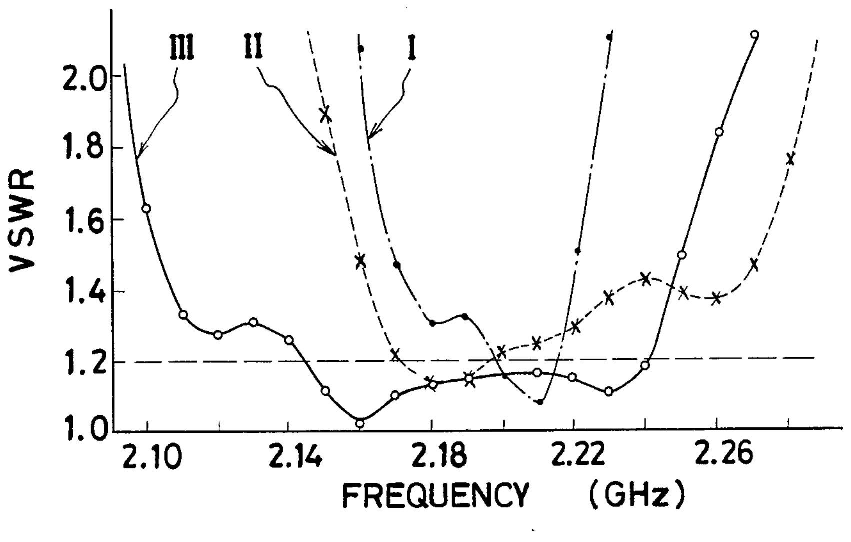
FIG. 5 is a graph showing the VSWR versus frequency of the antenna as the first embodiment and corresponding prior art characteristics.

FIGS. 4 and 5 show measurement data verifying this tendency. FIG. 4 shows axial ratio versus frequency, and FIG. 5 shows VSWR versus frequency. The sequential antenna constructed as a sample antenna is a 4-element array consisting of four back-side one-point excitation circular polarization patch antenna elements, with orientation angle and excitation phase shifted by $\pi/4$ with respect to one another. The figures also show comparative data on characteristics of a single antenna element and a conventional 4-element array consisting of two element-pairs. More particularly, curve I represents the characteristics of the single antenna element, curve II represents the characteristics of the conventional two-pair array antenna, and curve III represents the characteristics of the sequential array antenna according to this invention. It will be seen from FIG. 4 that with the conventional two-pair array antenna, the frequency range in which the axial ratio is below 2 dB, for instance, is 5.8 times that of the antenna element, whereas with the sequential array antenna according to the invention it is 10.3 times. In FIG. 5 it will be seen that with the conventional two-pair array antenna the frequency range in which the VSWR is below 1.2, for instance, is 1.5 times that of the antenna element, whereas with the sequential array antenna it is 5.5 times. It is obvious from these two characteristics that the invention is very effective for increasing the frequency coverage with respect to the circular polarization and VSWR.

In the first embodiment described above, a plurality of antenna elements are disposed in a spaced-apart positional relationship at arbitrary positions to construct a circular polarization antenna, but an equivalent circular polarization antenna can be constructed by disposing these antenna elements in one place as a unitary structure.

Figure 6A:
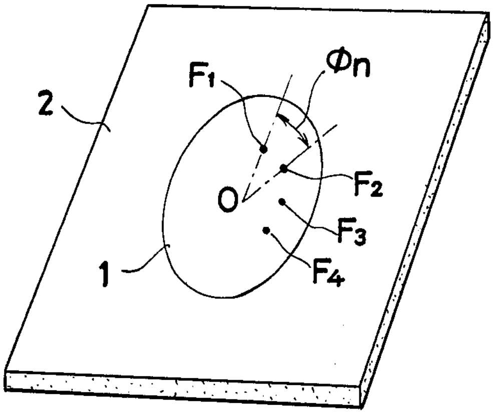
FIG. 6(*a*) is a schematic perspective view showing a radiating section of a circular polarization antenna as a second embodiment of this invention.
Figure 6B:
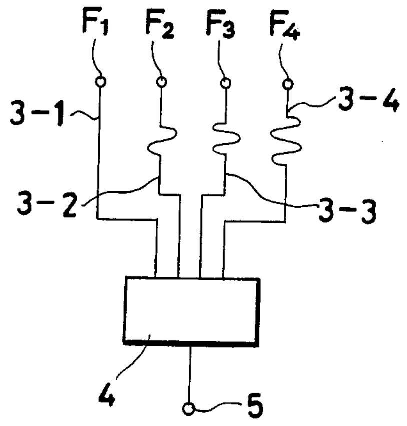

FIGS. 6(*a*) and 6(*b*) show a second embodiment of the invention applied to a circular polarization antenna consisting of a plurality of antenna elements provided as a unitary structure. More specifically, a plurality of antenna elements are formed unitarily as a one-piece microstrip patch antenna 1 of a disc shape on a substrate 2. The patch antenna 1 is provided with respective distinct feed points $F_1$ to $F_4$ which are drawn out to the opposite surface of the substrate 2. FIG. 6(*a*) shows the patch antenna viewed from the side from which electromagnetic waves are radiated. FIG. 6(*b*) shows the circuit construction of a feed section for feeding power signals to the feed points. In this embodiment, the feed points $F_1$ to $F_4$ are disposed such that they are symmetrical or have a definite periodicity with respect to the boresight axis. More specifically, they are disposed such that they are shifted by $\pi/N$ (by $\pi/4$ rad. in this embodiment) with respect to the center O of the antenna from one another. In the feed section, the lengths of feed lines 3-1 to 3-4 are set such that the phases of excitation are shifted by $\pi/N$ from one another in correspondence to the $\pi/N$ rad. angularly rotational relationship to one another. With the disposition of the feed points in the $\pi/N$ rad. angular shift relationship and $\pi/N$ rad. phase shift relationship, this antenna radiates perfectly circularly polarized wave (left-hand circular polarization (LHCP) in this structure) in the boresight direction on the basis of the principles noted above irrespective of the polarization in the case of one-point feeding.

While this embodiment of the antenna is the same in construction, function and effect as the preceding embodiment, it can cover a far wider frequency range with respect to the axial ratio and impedance than the conventional one-point or two-point feeding single antenna.

Figure 7:
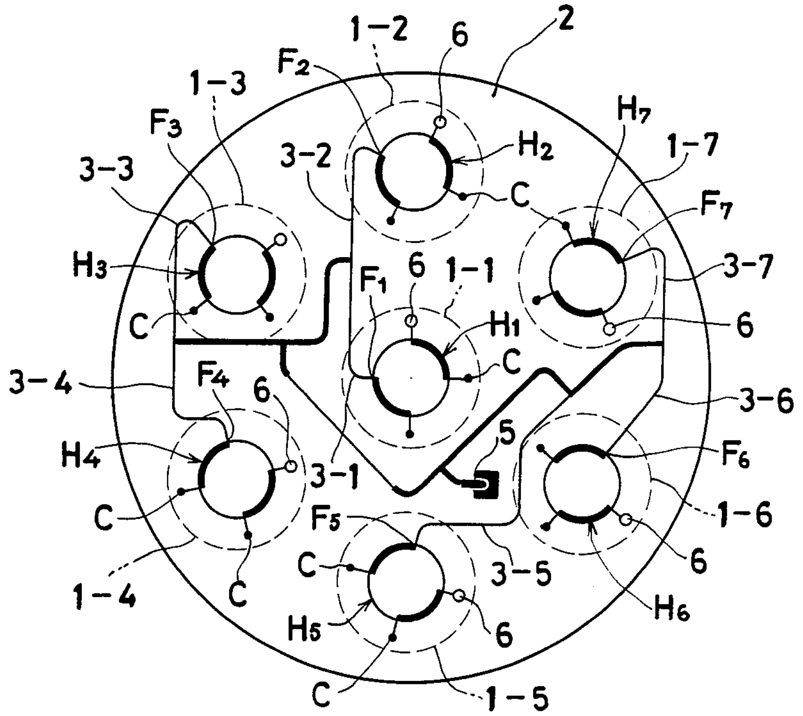
FIG. 7 is a back view showing a circular polarization antenna as a third embodiment of the invention.

FIG. 7 shows a third embodiment of this invention, which is a modification of the foregoing first embodiment where each antenna element has a single feed point. This embodiment is applied to a circular polarization antenna of what is commonly termed a two-point structure with two feed points provided on seven antenna elements. The figure shows the feed circuit of the circular polarization array antenna viewed from the back side. Antenna elements 1-1 to 1-7 shown by dashed lines are formed on the flat front side of the substrate. Circular hybrid circuits $H_1$ to $H_2$ are provided on the back side of the substrate 2 in correspondence to the respective antenna elements 1-1 to 1-7. They have respective feed points $F_1$ to $F_7$. Also, each of them have two connection points C spaced apart at an interval of 90 degrees. These connection points C are connected by conductive leads through the substrate 2 to the opposite front side antenna elements 1-1 to 1-7. The two-point feeding antenna having the hybrid circuit as described is in general use. According to the invention, a plurality of such two-point feeding antenna elements are disposed on the substrate 2 at arbitrary positions without any regular positional relationship. However, the angular orientation of the feed points $F_1$ to $F_7$ and connection points C of the individual antenna elements 1-1 to 1-7 is angularly shifted at an interval of $\pi/N$ rad. ($N=7$ in this case) with respect to a reference antenna element (for instance, antenna element 1-1). More specifically, those of the antenna element 1-2 are angularly spaced apart by $\pi/7$ rad. in the clockwise direction from those of the antenna element 1-1, those of the antenna element 1-3 are spaced apart likewise from those of the antenna element 1-2, and so forth.

An input/output terminal 5 is connected to the feed points $F_1$ to $F_7$ of antenna elements by respective feed lines 3-1 to 3-7 which constitute a feed section. In this section, the wiring pattern of the feed lines 3-1 to 3-7 has no particular significance, but their length from the input/output terminal 5 to the feed point is important. More specifically, their length is progressively increased with respect to the feed line to the reference antenna element at such an interval that an input signal coupled to the input/output terminal 5 is fed to the individual antenna elements with progressively delayed phase at an interval of $\pi/N$ corresponding to the frequency of the input signal. The width of the feed lines may be set suitably corresponding to the impedance of the feed lines. Reference numeral 6 in the figure designates a terminal resistor.

With the construction described above, a signal coupled to the input/output terminal 5 at the time of the transmission reaches the antenna elements 1-1 to 1-7 through the respective feed lines 3-1 to 3-7. However, since the length of the feed lines is progressively increased with respect to the reference antenna element (i.e., antenna element 1-1) at an interval corresponding to $\pi/N$ ($N=7$) of the phase of the signal, the signal arrived at the individual antenna elements is delayed for such phases. However, since the feed points $F_1$ to $F_7$ and connection points C of the individual antenna elements are in the angular relationship such that they are angularly spaced apart by $\pi/N$ rad. with respect to those of the reference antenna element 1-1, the radiated electromagnetic wave is perfectly circularly polarized in the boresight direction.

Figure 8A:
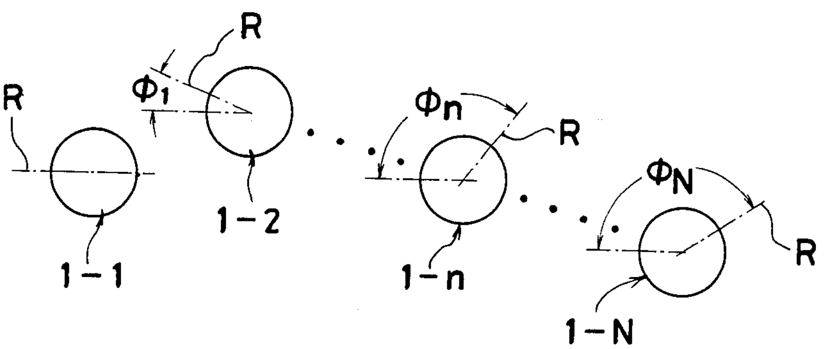
FIG. 8(*a*) is a plan view showing an array antenna for dual polarization as a fourth embodiment of the invention.
FIG. 8(b) is a schematic representation of the feed section used for the fourth embodiment of the antenna.
Figure 8B:
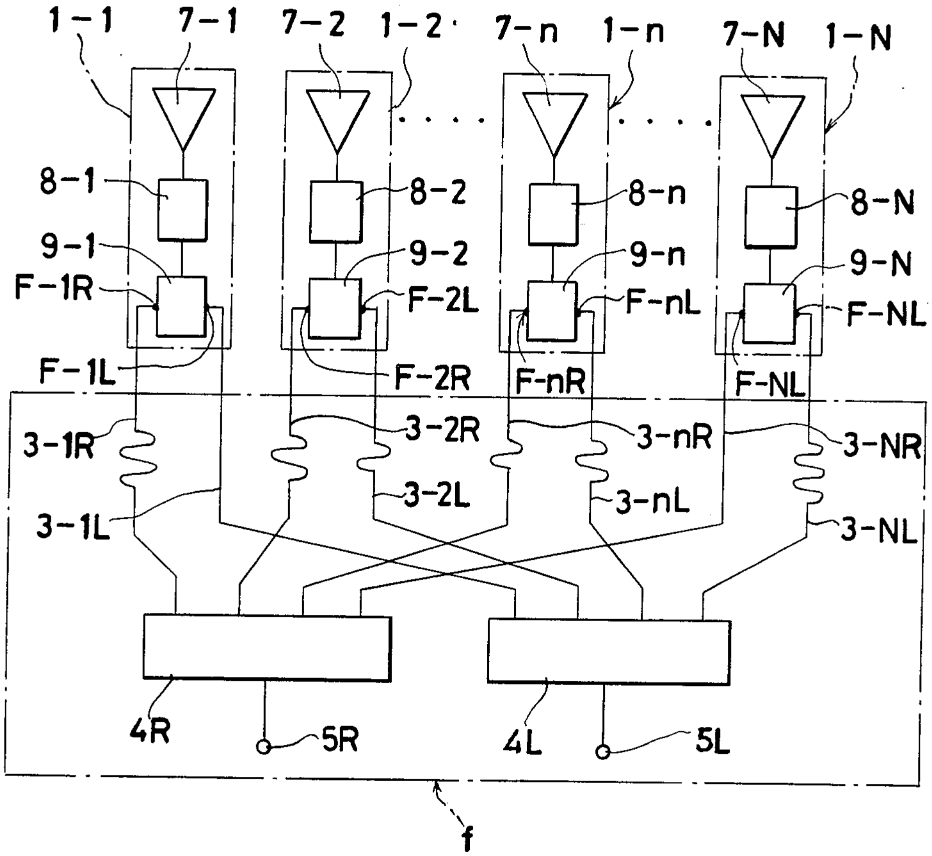

FIGS. 8(*a*) and 8(*b*) show a fourth embodiment of the circular polarization array antenna for the use of dual orthogonal polarizations.

In the figures, like means as in the preceding embodiments are designated by like reference symbols.

Antenna elements 1-1 to 1-N of the array antenna respectively include as integral components horn-type radiators 7-1 to 7-N, polarizers 8-1 to 8-N connected to the radiators and orthomode transducers (OMT) 9-1 to 9-N connected to the polarizers 8-1 to 8-N.

A feed section f includes power branch circuits, i.e., power dividers in a transmitting system and power combiners in a receiving system (hereinafter referred to simply as power dividers) of right-hand circular polarization (RHCP) and left-hand circular polarization (LHCP), which have respective input/output terminals 5R and 5L, RHCP feed lines 3-1R to 3-NR leading from the RHCP power divider 4R to OMTs 9-1 to 9-N, and LHCP feed lines 3-1L to 3-NR leading from the LHCP power divider 4R to the OMTs 9-1 to 9-N. The RHCP and LHCP feed lines 3-1R to 3-NR and 3-1L to 3-NL are connected to the OMTs 9-1 to 9-N at respective feed points F-1R to F-NR and F-1L to F-NL. The RHCP and LHCP feed points F-nR and F-nL provided as a pair on the OMT of each antenna element are angularly shifted by 90 degrees. The orientation of the RHCP feed points F-1R to F-NR of the individual antenna elements (shown by line R in FIG. 8(*a*)) is angled at a constant angular interval $\pi/N$ with respect to that of a reference antenna element. If the antenna element 1-1 is the reference antenna element, the RHCP feed point axis R of the antenna element 1-2 is shifted by $\pi/N$ from that of the reference antenna element 1-1, and that of the n-th antenna element 1−n is shifted by $(n-1)\pi/N$ from that of the reference antenna element.

The feed lines are arranged such as to distribute power to the individual antenna elements in a phase relationship corresponding to the orientation angle relationship of their feed points as in the preceding embodiments. More specifically, the feed lines 3-1R to 3-NR from the RHCP power divider 4R are arranged such that the individual antenna elements are excited in progressively advanced phase relationship at an interval of $\pi/N$ radians from the element 1-N toward the element 1-1. This means that the excitation phase is progressively advanced at an interval of $\pi/N$ rad. from the side of the element 1-1. As for the feed lines from the LHCP power divider 4L, the excitation phase is progressively delayed by $\pi/N$ rad. from the side of the antenna element 1-1. The arrangement of the feed lines as described is applicable where the orientation angle of the antenna elements is spaced apart in the clockwise direction, while the arrangement is reversed where the orientation angle is spaced apart counterclockwise.

Thus, with the circular polarization antenna of the above construction, a perfect LHCP wave can be radiated when power is supplied from the terminal 5L while perfectly RHCP wave is radiated when power is fed from the terminal 5R in accordance with the principles of the antenna as described earlier. This means that it is possible to obtain an antenna for dual orthogonal polarizations with excellent polarization discrimination.

While in many cases of conventional orthogonal polarization antennas it has been difficult to obtain sufficient polarization discrimination due to imperfectness of antenna elements and circular polarizers, with the above embodiment such imperfectness can be compensated for on the basis of the principles of the sequential array antenna. As a result, since high polarization discrimination is obtained over wide frequency band, frequency-eeuse communication system using two orthogonal circular polarizations can be realized.

While some embodiments of the circular polarization antenna according to the invention have been described, in any of these embodiments the feed lines must be arranged such that the feed points of the individual antenna elements are angularly spaced apart in orientation at an interval of $\pi/N$ and the phase of excitation of the individual antenna elements is correspondingly shifted at an interval of $\pi/N$. Usually, the feed line pattern is designed by a trial-and-error method until the requirements noted above are met. This procedure, however, is quite troublesome.

Now, a system which permits ready design of the feed points and feed lines will be described.

If feed lines providing the relative phase shift of $\phi_n$ are designed such that their radius r is:

$r=\lambda g/2\pi$ ($\lambda g$ being the guide wavelength of the feed line)

In the form of an arc subtending an angle equal to the angle of the n-th feed point or angle $\phi_n$ of the n-th antenna element, a phase shift corresponding to this arc is just the desired $\phi_n$ rad.

Figure 9:
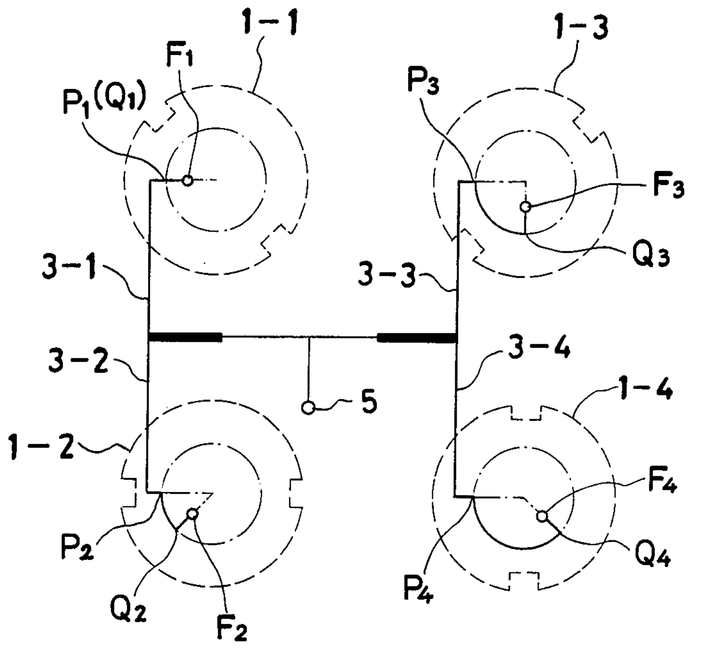
FIG. 9 is a schematic view showing a feed line arrangement for a circular polarization antenna according to this invention.

FIG. 9 shows an embodiment of the invention applied to a 4-element sequential array structure. Back-side one-point feed circular polarization patch antenna elements 1-1 to 1-4 shown by dashed lines are printedly provided on the opposite side of a substrate, while the feed lines shown by solid lines are laid on the front side.

The angular orientation of individual elements 1-1 to 1-4 is shifted at an interval of $\pi/4$ rad. with respect to the orientation of the element 1-1. Feed lines from an input-/output terminal 5 to respective points $P_1$ to $P_4$ have an equal length, and also line segments from point $Q_1$ to feed point $F_1$, . . . , from point $Q_4$ to point $F_4$ in the individual antenna elements also have an equal length. Segments of solid arcs $\widehat{P_2Q_2}$, $\widehat{P_3Q_3}$ and $\widehat{P_4Q_4}$ provide for respective relative phase shifts. All these arcs have a radius of $\lambda g/2\pi$ and subtend an angle corresponding to the angle $\phi_n=(n-1)\pi/4$ (n=1, 2, 3, 4) of the individual antenna elements. With this arrangement, a constant relationship of relative position between the feed points $F_1$ to $F_4$ and corresponding antenna elements 1-1 to 1-4 can be assured irrespective of the orientation angle of the antenna elements and feed points thereof. This process is generally applicable to all sequential antennas and sequential array antennas, thus facilitating the design of the feed lines.

What is claimed is:

1. A circular polarization antenna comprising:

a plurality of antenna elements having identical polarization characteristics and each having at least one feed point, said antenna elements being N ($N\geqq 3$) in number and spacially positioned on a plane at an orientation angle according to p $\pi/N$ rad. (where p is an integral number of $1\leqq p\leqq N-1$ with respect to the boresight direction, and a feed section connected to said antenna elements in respective differential phase shifts corresponding to said angular orientation of said antenna elements.

2. The circular polarization antenna according to claim 1, wherein said antenna elements are disposed in one place as a unitary structure and are provided with respective distinct feed points which are spaced apart at an angular interval of $\pi/N$ rad. with respect to the boresight direction, and said feed points of the corresponding antenna elements are fed with differential phase shifts of an interval of $\pi/N$ rad.

3. The circular polarization antenna according to claim 1, wherein said antenna elements have orthogonal circular polarization feed points for right-hand circular polarization and left-hand circular polarization, and said antenna elements are fed with orthogonal circular polarization excitation signals in respective relative phase shifts of $\pi/N$ rad.

4. The circular polarization antenna according to claim 3, wherein each said antenna element includes a radiator, a polarizer and an orthomode transducer connected to said polarizer, and said feed section includes right-hand circular and left-hand circular polarization power branch circuits connected to said orthomode transducers through feed lines.

5. The circular polarization antenna according to claim 1, wherein said feed section is provided with feed lines connected to the antenna elements, each said feed line being formed in the shape of an arc subtending an angle equal with said angular orientation of the corresponding antenna element so as to obtain the differential phase shift.

* * * * *